Patented Aug. 6, 1929.

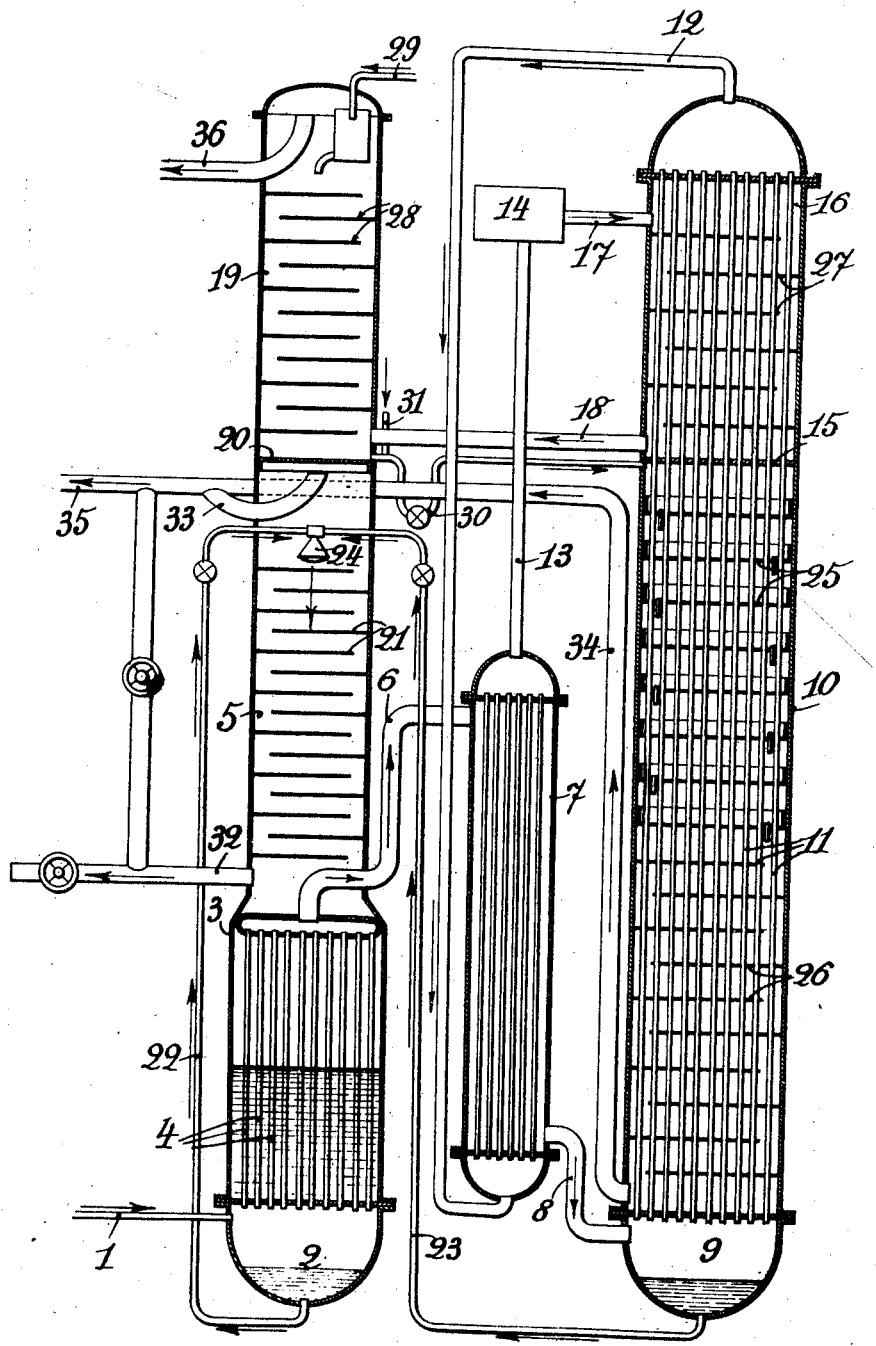

1,723,425

UNITED STATES PATENT OFFICE.

GEORGE FRANÇOIS JAUBERT, OF PARIS, FRANCE, ASSIGNOR TO SOCIÉTÉ AMMONIA, OF PARIS, FRANCE.

PROCESS OF SEPARATING HYDROGEN FROM GASEOUS MIXTURES.

Application filed December 26, 1924, Serial No. 758,289, and in France November 6, 1924.

The present invention relates to a process for the extraction of the hydrogen contained in industrial gases and chiefly in the gas from coke ovens, the said hydrogen being available for the synthesis of ammonia by direct catalysis or for like uses which are compatible with the presence of a certain quantity of nitrogen in the hydrogen.

In the said process the gas under treatment is successively freed from gases other than hydrogen by the systematic action of decreasing temperatures in a suitable separating device, all of the said gases or their products of condensation being collected and then distilled or rectified, or utilized in any suitable manner.

An important feature of the invention consists in the fact that the cold necessary to condense the gases accompanying the hydrogen is produced in the separating device not only by the known means such as the evaporation of liquids having a very low boiling point and obtained from the gases under treatment, and the expansion of the gas from treatment, but also by the apparatus in suitable motors, but also by the evaporation of a greater or less amount of liquid nitrogen supplied from an outside source.

By this means an unlimited amount of cold can be caused to act in the said separating device, and at a very low temperature, since the boiling point of nitrogen is $-196°$ C. In this manner the apparatus provides for a condensation as complete as may be desired of the gases accompanying the hydrogen, and chiefly of the carbon monoxide and nitrogen. The said apparatus can thus be made to deliver hydrogen or a mixture of hydrogen and nitrogen in a much purer state than can be obtained in the known apparatus.

This state of purity is advantageous not only in the subsequent utilization of the gases obtained, but also for the reason that there will be no obstruction due to the freezing of the carbon monoxide, in the exhaust orifices of the motor of the expansion type which is supplied by the gas discharged from the apparatus.

Another feature of the invention consists in the fact that when leaving the said separating device the hydrogen is subjected to a scrubbing action by means of liquid nitrogen, and thus becomes charged with the proper amount of gaseous nitrogen such as is for instance required for the direct synthesis of ammonia. The regulation of this amount will depend upon the vapour tension of the liquid nitrogen and can be readily carried out by regulating the expansion of the hydrogen in the said motor, since the said vapour tension varies greatly with the temperature in the vicinity of $-200°$, and is thus very responsive to variations in the temperature of the expanded hydrogen traversing the liquid nitrogen.

Another feature consists in the fact that the gas under treatment which is preliminarily freed from water vapour, carbonic anhydride and heavy hydrocarbons, and compressed to 20–30 atmospheres, is circulated— after being cooled in a suitable cooling device,—in two successive separators; the first separator comprises on the one hand a set of tubes traversed by the gas and cooled by a bath of methane boiling at atmospheric pressure (i. e. at $-164°$ C.) and on the other hand a vertical chamber or column supplying this bath of pure methane while rectifying the mixture of methane and carbon monoxide produced by condensation in the apparatus. The second separator, which is supplied with gas thus freed in a great measure from methane and carbon monoxide, comprises a set of tubes cooled at the upper part by the expanded hydrogen obtained from the exhaust of the motor, at the middle part by the boiling of liquid nitrogen from an outside source, and at the lower part by the gaseous nitrogen due to the evaporation of the said liquid nitrogen.

When ascending through the said set of tubes, the gas is subjected to the action of a supply of cold which may be as large as desired, since an unlimited amount of liquid nitrogen is available for the purpose, so that the temperature of the tubes can be maintained as low as may be desired and in a reliable manner in all parts of the same, irrespective of the output of gas in the apparatus. The progressive purifying of the hydrogen by condensation and by the removal of the elements, which are less easily liquefied as the operation continues, is performed in the tubes which are thus cooled in a much more complete manner than if the cold employed would be supplied exclusively by the gas under treatment which is preliminarily compressed.

The appended drawings show by way of example a vertical section of an arrangement of apparatus according to the invention.

The gas under treatment, which is preliminarily freed from water vapour, carbon dioxide and the heavy hydrocarbons, and containing only methane, oxygen, carbon monoxide, nitrogen and hydrogen, is supplied through the conduit 1 at a pressure of 20–30 atmospheres and cooled to about $-100°$ C. in the lower part 2 of the first separating device 3. The latter comprises a set of tubes 4 contained in a rectifying column 5, the upper part of said tubes being connected by the conduit 6 with a temperature exchanger 7; the latter is connected by the conduit 8 with the lower part 9 of a second separating device 10. Within the latter is mounted a set of long and narrow tubes 11. A conduit 12 connects the upper part of the set of tubes with the lower part of the temperature-exchanging device 7 the top part of which is connected by a conduit 13 with a motor of the expansion type 14. A partition 15 forms a chamber 16 at the top of the separator casing 10, the upper part of said chamber being connected by the conduit 17 to the exhaust of the motor 14 and the lower part by the conduit 18 with a chamber 19 which is formed at the top of the separator 5 by the partition 20.

The upright chamber 5 is provided above the set of tubes 4 with a series of plates 21 upon which is discharged the liquid supplied by the conduits 22 and 23, from the lower part of the separators 3 and 10, to the sprinkler 24.

On the other hand, the separator casing 10 contains below the partition 15 a set of basins 25 provided with an overflow and with the baffles 26; above the partition are also disposed the baffles 27 in the chamber 16. In like manner, the plates 28 are disposed within the chamber 19.

A conduit 29 supplies to the top of the latter chamber the liquid nitrogen obtained from an external source in such manner that it will spread out and flow in streams upon the plates 28. A conduit 30 circulates the liquid from the lower part of the chamber 19 into the separator 10 immediately below the partition 15. Upon the said conduit is a branch 31 through which an additional amount of liquid nitrogen may be supplied. The conduits 32 and 33 leading from the chamber 5 on the one hand and a conduit 34 leading from the separator 10 on the other hand serve for the evacuation of gases other than hydrogen; said conduits are connected with a common outlet conduit 35, but suitable cocks provide for a separate discharge of the gases if desired. 36 is the discharge conduit for the hydrogen mixed with nitrogen.

The normal operation of the apparatus is as follows:

The gases under treatment are supplied at 1 in the pure and compressed state, and the liquid nitrogen—under pressure if necessary—is supplied at 29 and optionally at 31. The arrows show the circulation in the apparatus, from the lower part of the separator 3 the gas is circulated through the tubes 4 and the casing of the temperature-exchanging device 7 and enters the bottom of the separator 10; it rises through the tubes of the latter and flows through the conduit 12, the tubes of the temperature-exchanging device 7 and the conduit 15 to the motor 14 in which it expands and produces work; when thus expanded and cooled (and optionally under a certain pressure) the gas circulates in the chamber 16 and then flows through the conduit 18 into the chamber 19 in which it becomes saturated with nitrogen before issuing through 36.

At the same time the liquid nitrogen entering through 29 falls in streams through the chamber 19 and flows thence through 30 into the separator 10 and then into the basins 25 in which it boils while strongly cooling the tubes 11; the gaseous nitrogen which is obtained circulates between the baffles 26 and is discharged through 34 and 35.

On the other hand, the liquid products of condensation which flow upon the internal walls of the tubes 4 and 11 and collect at the bottom of the separators are brought through 22, 23 and 24 to the top of the chamber 5 in which the pressure is relatively low, and then flow down upon the plates 21; the non-volatilized part of this liquid collects around the tubes 4 and cools the latter by its evaporation. The gases which are evolved issue through 32 and 33.

The dimensions of the several parts of the apparatus and the operating conditions can be regulated with facility, and chiefly the supply of liquid nitrogen and the degree of expansion of the engine, so as to obtain in the tubes 4 the condensation of the major part of the carbon monoxide, and in the tubes 11 the condensation of the remainder of the methane and carbon monoxide and also of the oxygen and a great part of the nitrogen.

The upper part of the separator 10 will thus be supplied solely with pure hydrogen; mixed with a small quantity of nitrogen and also containing the whole amount of the rare gases.

This hydrogen which is discharged from the coldest part of the separator 10 will act when circulating for example in the exchange device 7—in which it is heated—to cool the gas issuing from the first separator; when at the proper temperature it then expands in the motor 14. By reason of the purity of the gas, the discharge conduits will not be obstructed, and the expansion may be carried out to any desired point in order to cool the chamber 16 to $-205°$ C. or even below.

In these conditions, the gas under treatment, which has already been freed from the major part of the methane and carbon monoxide is subjected in the tubes 11 to a gradually decreasing temperature which varies from about $-180°$ C. at the lower part of the tube to about $-196°$ C. in the portion occupied by the basins containing boiling liquid nitrogen and to about $-205°$ C. in the chamber 16.

The impurities which may be drawn forward by entraining with the hydrogen in the gaseous, solid or other state, beyond the tubes, 11 will be retained by the liquid nitrogen traversed by the hydrogen when circulating between the plates 28.

For the manufacture of ammonia, the supply of liquid nitrogen through 29 and the temperature and pressure of the hydrogen entering the chamber 19 are so regulated that the hydrogen is mingled with exactly the proper amount of nitrogen, or about 33 per cent. This regulation can be effected with facility without prejudice to the cooling of the chamber 16 because as above stated a variation of a few degrees in the vicinity of $-200°$ C. will be sufficient to modify the vapour tension of the liquid nitrogen to a considerable degree.

If the supply of nitrogen through 29 is to be reduced to such a degree as to compromise the maintenance of a low temperature in the separator 10, this can be easily remedied by an additional supply of liquid nitrogen through 31.

It should be noted that the liquid discharged from the sprinkler 24 which consists of methane and carbon monoxide, becomes rectified when descending through the chamber 5, so that pure methane will be contained in the lower part of the chamber; the gaseous methane which issues through the conduit 32 may be separately collected if necessary.

Obviously, the said invention is not limited to the constructional form hereinbefore described which is shown diagrammatically and by way of example, and the forms and arrangements of the several elements of the plant are susceptible of modifications, as well as the pressure and temperature in the various parts of the apparatus.

For instance the chambers 16 and 19 may be distinct from the separators 3 and 10 instead of being directly superposed upon the latter the baffles may have any other suitable arrangement, and other modifications may be made.

Having thus described my process and apparatus what I claim as new therein, and my own invention, is:

The process of separating hydrogen contained in coal gas which comprises passing the coal gas in heat exchange relation with cold liquefied constituents thereof other than hydrogen, passing the so-cooled gas in confined streams in heat exchange relation with cold liquefied nitrogen, allowing the further cooled gas to expand and thus produce work, and thereafter passing the expanded gas into contact with liquid nitrogen under pressure.

In testimony that I claim the foregoing as my invention, I have signed my name.

GEORGE FRANÇOIS JAUBERT.